United States Patent
Kim et al.

(10) Patent No.: US 11,277,812 B2
(45) Date of Patent: Mar. 15, 2022

(54) METHOD FOR TRANSMITTING/RECEIVING REFERENCE SIGNAL IN WIRELESS COMMUNICATION SYSTEM, AND DEVICE THEREFOR

(71) Applicant: LG ELECTRONICS INC., Seoul (KR)

(72) Inventors: Myeongjin Kim, Seoul (KR); Sangrim Lee, Seoul (KR); Woonghee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 16/642,821

(22) PCT Filed: Aug. 29, 2018

(86) PCT No.: PCT/KR2018/009943
§ 371 (c)(1),
(2) Date: Feb. 27, 2020

(87) PCT Pub. No.: WO2019/045429
PCT Pub. Date: Mar. 7, 2019

(65) Prior Publication Data
US 2020/0351815 A1    Nov. 5, 2020

Related U.S. Application Data

(60) Provisional application No. 62/552,405, filed on Aug. 31, 2017.

(51) Int. Cl.
*H04W 24/00* (2009.01)
*H04W 64/00* (2009.01)
(Continued)

(52) U.S. Cl.
CPC .......... *H04W 64/006* (2013.01); *G01S 11/04* (2013.01); *H04L 5/0048* (2013.01); *H04W 72/042* (2013.01)

(58) Field of Classification Search
USPC .......................... 342/465, 462, 442, 450, 463
See application file for complete search history.

(56) References Cited

U.S. PATENT DOCUMENTS

2011/0124347 A1    5/2011    Chen et al.

FOREIGN PATENT DOCUMENTS

| JP | 2003207557 | * | 7/2003 |
| KR | 10-2016-0006659 A | | 1/2016 |

(Continued)

OTHER PUBLICATIONS

Kusy_Proc._4th_European_Conf._Wireless_Sensor_Networks_Delft_Netherlands_pp. 51-66_Springer_2007 (Year: 2007).*
(Continued)

*Primary Examiner* — Jinsong Hu
*Assistant Examiner* — Alexander J Yi
(74) *Attorney, Agent, or Firm* — Dentons US LLP (57) ABSTRACT

A method whereby a user equipment transmits/receives a reference signal for distance measurement in a wireless communication system according to an embodiment of the present invention comprises: a step of receiving, from a base station, a downlink (DL) positioning reference signal (PRS) including sinusoidal components of different angular frequencies; a step of acquiring a phase difference between the sinusoidal components of the DL PRS; a step of transmitting a first uplink (UL) PRS indicating the phase difference, so as to measure a first distance between the user equipment and the base station at a first point of time; and a step of transmitting a second UL PRS so as to measure a second distance between the user equipment, the position of which has changed after the first point of time, and the base station, wherein the user equipment may configure the same phase difference, acquired via the DL PRS before the first point of time, for the second UL PRS, without receiving an addi- (Continued)

tional DL PRS for measuring the second distance. The user equipment is capable of communicating with at least one of another user equipment, a user equipment related to an autonomous driving vehicle, the base station or a network.

10 Claims, 9 Drawing Sheets

(51) Int. Cl.
    *G01S 11/04* (2006.01)
    *H04L 5/00* (2006.01)
    *H04W 72/04* (2009.01)

(56) References Cited

FOREIGN PATENT DOCUMENTS

| | | |
|---|---|---|
| WO | 2016/003154 A1 | 1/2016 |
| WO | 2016/129908 A1 | 8/2016 |

OTHER PUBLICATIONS

Qualcomm_Incorporated_3GPP_TSG-RAN_WG1_Meeting_85_Nanjing_China_May 23-27, 2016_R1-164450 (Year: 2016).*
Ericsson_3GPP-TSG-RAN1_Meeting_87_Reno_Nevada_USA_Nov. 14-18, 2016_R-1611103 (Year: 2016).*
Ericsson: "PRS configurations for FeMTC", R1-1611103, 3GPP TSG RAN Meeting #87, Reno, Nevada, USA, Nov. 14-18, 2016.

\* cited by examiner

METHOD FOR TRANSMITTING/RECEIVING REFERENCE SIGNAL IN WIRELESS COMMUNICATION SYSTEM, AND DEVICE THEREFOR

This application is a National Stage Application of International Application No. PCT/KR2018/009943, filed on Aug. 29, 2018, which claims the benefit of U.S. Provisional Application No. 62/552,405, filed on Aug. 31, 2017, all of which are hereby incorporated by reference in their entirety for all purposes as if fully set forth herein.

TECHNICAL FIELD

The present disclosure relates to transmitting and receiving reference signals in a wireless communication system, and more particularly, to a method for transmitting or receiving a positioning reference signal (PRS) for estimation of a location, and an apparatus therefor.

BACKGROUND ART

Figure 1:
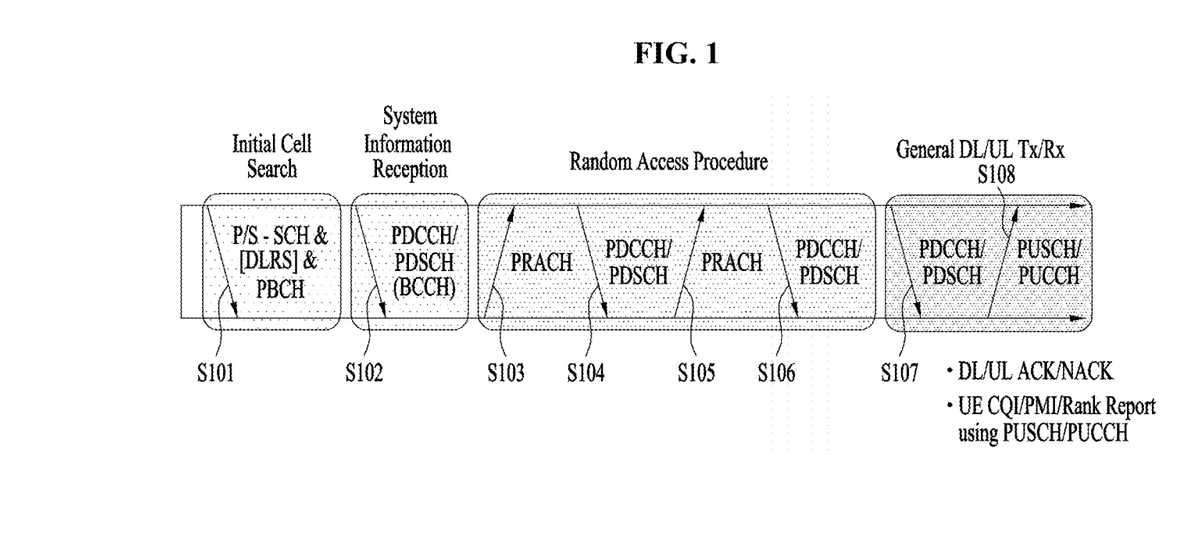
FIG. 1 illustrates physical channels used in a 3rd generation partnership project (3GPP LTE)/long term evolution-advanced (LTE-A) system and a general signal transmission method using the physical channels.

First, the existing 3rd generation partnership project long term evolution (3GPP LTE)/long term evolution-advanced (LTE-A) system will be briefly described. Referring to FIG. 1, a user equipment (UE) performs an initial cell search (S101). In the initial cell search process, the UE receives a primary synchronization channel (P-SCH) and a secondary synchronization channel (S-SCH) from a base station (BS), performs downlink synchronization with the BS, and acquires information such as a cell identifier (ID). Thereafter, the UE acquires system information (e.g., master information block (MIB)) through a physical broadcast channel (PBCH). The UE can receive the downlink (DL) reference signal (RS) and check the downlink channel status.

After the initial cell search, the UE can acquire more detailed system information (e.g., system information blocks (SIBs)) by receiving a Physical Downlink Control Channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCC/PDSCH reception (S107) and physical uplink shared channel (PUSCH)/physical uplink control channel (PUCCH) transmission (S108) as a general uplink/downlink signal transmission procedure. The UE can transmit uplink control information (UCI) to the BS. The UCI may include hybrid automatic repeat request acknowledgment/negative acknowledgment (HARQ ACK/NACK), scheduling request (SR), channel quality indicator (CQI), precoding matrix indicator (PMI) and/or rank indicator (RI), etc.

DISCLOSURE

Technical Problem

An object of the present invention is to provide a method and device for accurately and efficiently measuring a distance between a terminal and a base station based on a phase difference of reference signals transmitted and received by the terminal and the base station.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure for achieving the above object, a method for transmitting and receiving, by a terminal, a reference signal for distance measurement in a wireless communication system may include receiving a downlink (DL) positioning reference signal (PRS) including sinusoidal components of different angular frequencies from a base station, acquiring a phase difference between the sinusoidal components of the DL PRS, transmitting a first uplink (UL) PRS indicating the phase difference for measurement of a first distance between the terminal and the base station at a first time, and transmitting a second UL PRS for measurement of a second distance between the terminal present at a changed location after the first time and the base station, wherein the terminal configures, in the second UL PRS, the same phase difference acquired through the DL PRS before the first time, without receiving an additional DL PRS for measurement of the second distance.

In another aspect of the present disclosure for achieving the above object, a terminal for transmitting and receiving a reference signal for distance measurement in a wireless communication system may include a transceiver and a processor configured to receive a downlink (DL) positioning reference signal (PRS) including sinusoidal components of different angular frequencies from a base station through the transceiver, acquire a phase difference between the sinusoidal components of the DL PRS, transmit a first uplink (UL) PRS indicating the phase difference for measurement of a first distance between the terminal and the base station at a first time, and transmit a second UL PRS for measurement of a second distance between the terminal present at a changed location after the first time and the base station, wherein the processor may configure, in the second UL PRS, the same phase difference acquired through the DL PRS before the first time, without receiving an additional DL PRS for measurement of the second distance.

In another aspect of the present disclosure for achieving the above object, a method for transmitting and receiving, by a base station, a reference signal for distance measurement in a wireless communication system may include transmitting a downlink (DL) positioning reference signal (PRS) including sinusoidal components of different angular frequencies to a terminal, receiving a first uplink (UL) PRS indicating a phase difference between the sinusoidal components of the DL PRS, measuring a first distance between the terminal and the base station at a first time based on the first UL PRS, receiving a second UL PRS without transmitting an additional DL PRS to the terminal present at a changed location after the first time, and measuring a second distance between the terminal present at the changed location after the first time and the base station based on the second UL PRS.

The terminal may transmit the first UL PRS and the second UL PRS based on a UL PRS configuration acquired from the base station, wherein, based on change in speed of the terminal greater than or equal to a threshold, the terminal may make a request to the base station for change of the UL PRS configuration.

The terminal may report a speed of the terminal upon initial access to the base station, wherein, based on a difference between the reported speed and a current speed of the terminal greater than or equal to the threshold, the terminal may make the request to the base station for change of the UL PRS configuration.

The UL PRS configuration may include UL PRS periodicity information, UL PRS subframe information, and UL PRS resource information.

The phase difference may be related to $(w_2-w_1)*(t_{s,Rx}-t_{a,Rx})$, wherein 'w1' and 'w2' may denote the angular frequencies of the sinusoidal components of the DL PRS, respectively, '$t_{s,Rx}$' may denote a start time for signal processing of the DL PRS by the terminal, and '$t_{a,Rx}$' may denote an arrival time of the DL PRS at the terminal.

Advantageous Effects

According to an embodiment of the present disclosure, when a distance between a terminal and a base station is changed as the terminal moves, the terminal does not need to transmit and receive both DL/UL PRSs to continuously measure the changed distance, but only needs to transmit an additional UL PRS. Accordingly, the DL PRS overhead may be reduced.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of universal mobile telecommunications system (UMTS). 3rd generation partnership project long term evolution (3GPP LTE) is a part of evolved UMTS (E-UMTS) that uses E-UTRA. 3GPP LTE adopts OFDMA in downlink and adopts SC-FDMA in uplink. LTE-advanced (LTE-A) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Position measurement in a legacy LTE system will first be described briefly.

Position Measurement in LTE Systems

In the LTE system, a location position protocol (LPP) has been introduced. In an LPP model, a location server may transmit assistance data for positioning to a UE. That is, the location server may transmit the assistance data to the UE to enable the UE to use observed time difference of arrival (OTDOA)/assisted global navigation satellite system (A-GNSS). In the LPP model, the UE uses a reference signal (RS) (e.g., positioning RS) for positioning and transmits measurement information or location information from the RS to the location server (e.g., Evolved Serving Mobile Location Center (E-SMLC)/UPL location platform (SLP)), and the location server is responsible for making a final decision on a location. Location information and a method of transmitting and receiving the location information are standardized into the LPP standard, and the LPP standard may include an information element (IE) and a signaling procedure for location information.

The LPP technology largely includes three functions: one of them is A-GNSS, another function is OTDOA, and the other is enhanced cell ID (E-CID).

A-GNSS is a satellite-based positioning scheme, which offers the benefit of shortening an initial positioning time because basic satellite information for positioning is received through a wireless network (e.g., LTE). In the A-GNSS scheme, accurate location information is obtained through communication between a global positioning system (GPS) and a location server of the network.

In OTDOA, a measurement value called a reference signal time difference (RSTD) is used to calculate a propagation time difference between a reference evolved Node B (eNB) and a neighboring eNB. That is, a signal in a specific frame is received from the neighboring eNB, a tap closest in time to a tap received from the neighboring eNB is selected from among delay taps received in the frame from the reference eNB, and the time difference between the taps is calculated as an RSTD value. Therefore, performance may depend on how effective taps are estimated. As such, OTDOA is a scheme in which a UE obtains a distance and a location based on the difference between arrival times of multiple eNB (or cell) signals.

E-CID is a scheme of narrowing the location of a UE by combining a legacy CID scheme and a received signal strength indication (RSSI) scheme into a hybrid scheme. A received signal received power (RSRP) and a received signal received quality (RSRQ) are provided as related measurement values. In the E-CID scheme, the UE estimates a location through round trip measurement, pathloss related measurement, and angle of arrival measurement based on analysis of the RSRP of an LTE OFDMA signal.

PRS Transmission for PDOA (Phase Difference of Arrival) Based Positioning

The present disclosure proposes a method for transmitting a reference signal (PRS) by a base station and a UE in order to estimate the distance between the base station and the UE and the location of the UE based on phase information.

First, a method of measuring, by a device which is a target of location measurement, a distance based on phase information about RSs received from multiple transmitters will be described. In the following description, a wireless device that transmits a signal first is referred to as a transmission device, and a device that receives a signal first is referred to as a reception device. It should be noted, however, that the transmission device may also receive a signal later, and the reception device may also transmit a signal. That is, the transmission device may include a transmitter and a receiver, and the reception device may include a transmitter and a receiver. As an example, the transmission device and the reception device may be a BS and a UE. As another example, the transmission device and the reception device may be a plurality of BSs or a plurality of UEs.

While the following examples are based on the assumption of transmission and reception of signals in two angular frequencies, which should not be construed as limiting the present disclosure, the present disclosure may be applied to more angular frequencies. It is also assumed in the examples that multiple angular frequency components are transmitted simultaneously, for the convenience of description. However, it is also possible to implement the present disclosure by transmitting the frequencies at predetermined different time points and considering the transmission time difference.

Further, it is assumed that a time point at which the transmission device/the reception device perform a signal transmission/reception operation is quantized. For example, when the transmission device/the reception device transmits/receives an OFDM signal, a boundary point of each OFDM symbol is a quantized time point for performing a transmission/reception operation. It is assumed that the starting time points of the transmission and reception operations of the transmission device and the reception device are $t_{s,TX}$ and $t_{s,RX}$, respectively, and are repeated every $t_{symb}$. Here, $t_{symb}$ may be the length of an OFDM symbol.

Figure 2:
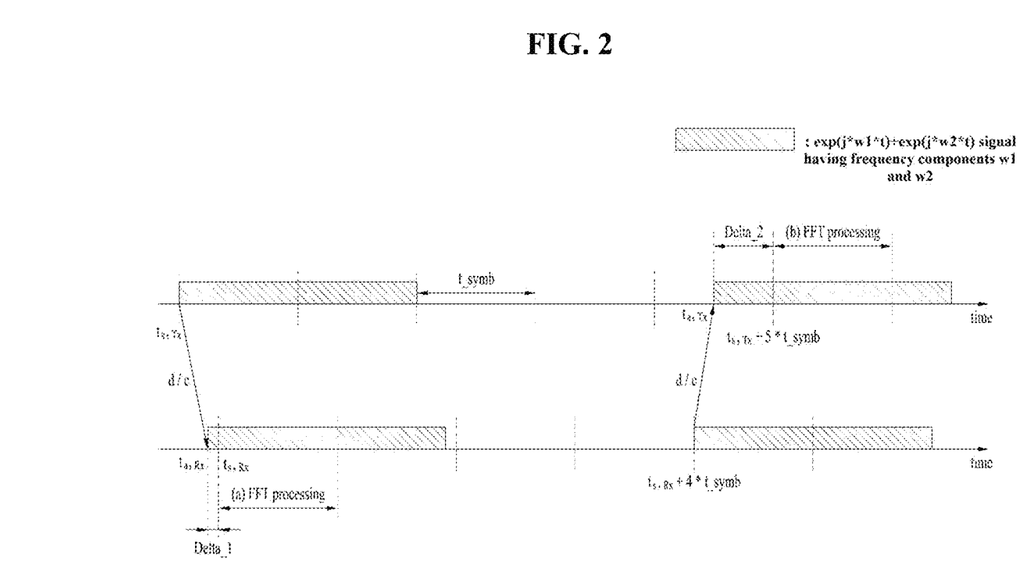
FIG. 2 illustrates a series of processes for measuring the distance between a transmission device and a reception device according to an embodiment of the present disclosure.

FIG. 2 is a flowchart illustrating a series of processes for measuring the distance between a transmission device and a reception device according to an embodiment of the present disclosure. While it is assumed that the reception device has been synchronized with a synchronization signal transmitted by the transmission device, for the convenience of description, distance measurement based on a phase difference may also be applied even when the transmission device and the reception device are asynchronous with each other.

Although for the convenience of description, a signal repeatedly transmitted during two symbols is considered, a signal transmission having a cyclic prefix (CP) and data for one symbol length may also be considered.

First, the transmission device transmits a sinusoidal signal having angular frequencies w1 and w2 as an RS (e.g., ranging RS) for distance measurement at a time $t_{s,Tx}$. For example, an RS for distance measurement at a specific time t may be defined by $RS(t)=e^{j*w1*t}+e^{j*w2*t}$. For simplicity, a signal transmitted by the transmission device is referred to as a first signal.

The transmitted first signal is delayed by d/c based on the distance d between the transmission device and the reception device and the speed c of light and arrives at the reception device at a time $t_{a,Rx}$.

Due to sampling (or quantization), the reception device actually starts to acquire a baseband signal (e.g., sampled values) at the time $t_{a,Rx}$. If the size of fast Fourier transform (FFT) performed by the reception device is N, the reception device may obtain values corresponding to $w_1$ and $w_2$ by subjecting a total of N sampled values to FFT.

The phase difference between a $w_1$ component, $X_{RX}(w_1)$ and a $w_2$ component, $X_{RX}(w_2)$ of the FFT sampled values may be obtained by Equation 1.

$$\frac{X_{RX}(w_2)}{X_{RX}(w_1)} = \exp(j*(w_2 - w_1)(t_{s,RX} - t_{a,RX})) \quad \text{[Equation 1]}$$

In Equation 1, the phase difference is $(w_2-w_1)(t_{s,RX}-t_{a,RX})$. $X_{RX}(w_1)/X_{RX}(w_2)$ is a value that may be calculated from the first signal received by the reception device, and $(w_2-w_1)$ is a predefined value already known to the reception device. Therefore, the reception device may obtain Delta_1=$t_{s,RX}-t_{a,RX}$ by Equation 1. Delta_1 represents the difference between the starting time of OFM processing at the reception device and an actual arrival time of the first signal at the reception device.

Like the transmission device, the reception device transmits a sinusoidal signal (referred to as a second signal) having the angular frequencies w1 and w2 after n symbols. In FIG. 2, it is assumed that n=4.

Upon receipt of the second signal, the transmission device may acquire Delta_2=$t_{s,Tx}$+(n+1)*t_symb-$t_{a,Tx}$ by FFT-processing N sampled values acquired starting from a time '$t_{s,Tx}$+(n+1)*t_symb'.

Therefore, the round trip time (RTT) of a signal is defined by Equation 2.

$$2*d/c = t\_symb - Delta\_2 - Delta\_1 \quad \text{[Equation 2]}$$

As described, c is a fixed constant (i.e., the speed of light). Although the transmission device knows the values of Delta_2 and t_symb, the transmission device does not know the value of Delta_1. Therefore, to measure the distance d between the transmission device and the reception device, the transmission device should acquire information about Delta_1 measured by the reception device. To this end, the reception device may provide a value of Delta_1 to the transmission device through the second signal. For example, when it is assumed that the value of Delta_1 corresponds to phase difference B, the reception device may set the phase difference between the w1 sinusoidal component and the w2 sinusoidal component in the second signal transmitted after n symbols (e.g., a positioning reference signal) to B. The transmission device may measure the distance between the transmission device and the reception device based on the received second signal.

More generally, the reference signal RS(t) for distance measurement at a specific time t may be defined as $RS(t) = \alpha_1 * e^{j*(w1*t+\beta_1)} + \alpha_2 * e^{j*(w2*t+\beta_2)}$. In this case, the first signal may be understood as the sum of a first sinusoidal component, $x_1(t) = \alpha_1 * e^{j*(w1*t+\beta_1)}$, and a second sinusoidal component, $x_2(t) = \alpha_2 * e^{j*(w2*t+\beta_2)}$. Here, $\alpha_1$ denotes the amplitude of the first sinusoidal component, and $\alpha_2$ denotes the amplitude of the second sinusoidal component. $\beta_1$ denotes the phase of the first sinusoidal component at t=0 (e.g., initial phase value or initial phase offset), and $\beta_2$ denotes the phase of the second sinusoidal component at t=0. The values of $\beta_1$ and $\beta_2$ may be pre-agreed between the transmission device and the reception device. In this case, Equation 1 may be modified as Equation 3 below.

$$\frac{X_{RX}(w_2)}{X_{RX}(w_1)} = \frac{\alpha_2}{\alpha_1} * e^{j*\{(w_2-w_1)(t_{s,RX}-t_{a,RX})+(\beta_2-\beta_1)\}} \quad \text{[Equation 3]}$$

In Equation 3, the phase difference $\Psi$ is $(w_2-w_1)(t_{s,RX}-t_{a,RX})+(\beta_2-\beta_1)$, and the difference between the initial phase values $(\beta_2-\beta_1)$ present since the time of transmission of the first signal should be removed from the phase difference $\Psi$. For example, the reception device may correct the phase difference $\Psi$ to $\theta$ based on the initial phase values.

Since the values of $\beta_1$ and $\beta_2$ may be pre-agreed between the transmission device and the reception device, the phase difference $\theta$ according to the difference between the arrival time and the FFT start time as obtained by removing $(\beta_2-\beta_1)$ is $(w_2-w_1)(t_{s,RX}-t_{a,RX})$. In addition, as described above, the reception device transmits the second signal after n symbols. Upon receiving the second signal, the transmission device may perform FFT on N sampling values acquired from the time '$t_{s,TX}+(n+1)*t\_symb$'. Thus, Delta_2=$t_{s,TX}+(n+1)*t\_symb-t_{a,TX}$ may be obtained through the corrected phase difference $\theta$.

In order to obtain the distance between a BS and a UE based on a phase difference as described above, the BS first sends a downlink (DL) PRS at different frequencies, and then the UE needs to measure the phase difference of the DL PRS received from each BS. In addition, the UE need to transmit the information about the measured phase difference to the BS through UL PRS such that the BS may measure the distance between the BS and the UE.

When the UE moves, the distance between the BS and the UE frequently changes, and therefore the BS/UE need to frequently transmit DL/UL PRSs to accurately measure the distance between the BS and the UE. As a result, the DL/UL PRS overhead may be greatly increased.

In order to address this issue, the present disclosure proposes a method for efficiently transmitting the DL/UL PRS in a situation where the UE is moving. According to the proposed technique, the distance between the BS and the UE may be measured with a UL PRS without transmitting the DL PRS and the UL PRS every time the distance is measured.

Figure 3:
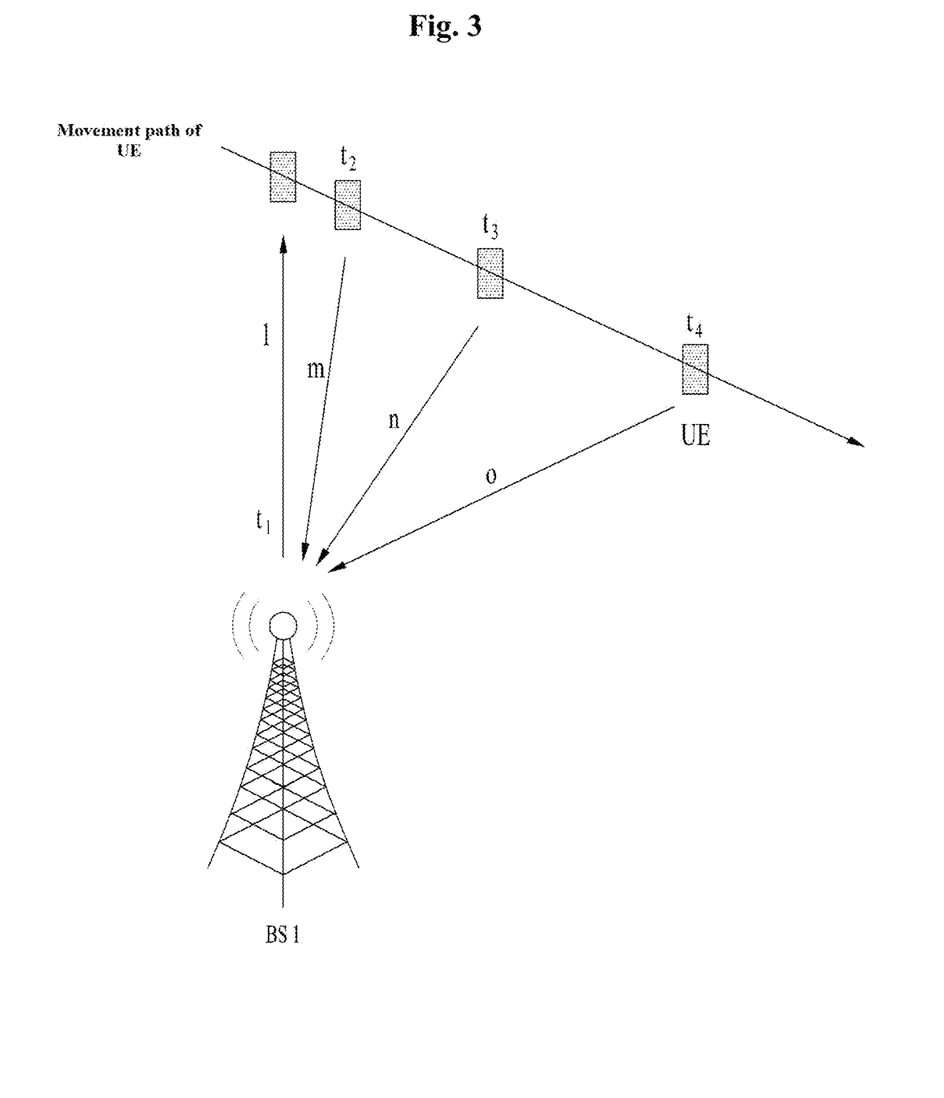
FIG. 3 illustrates an example of a movement path of a UE.
Figure 4:
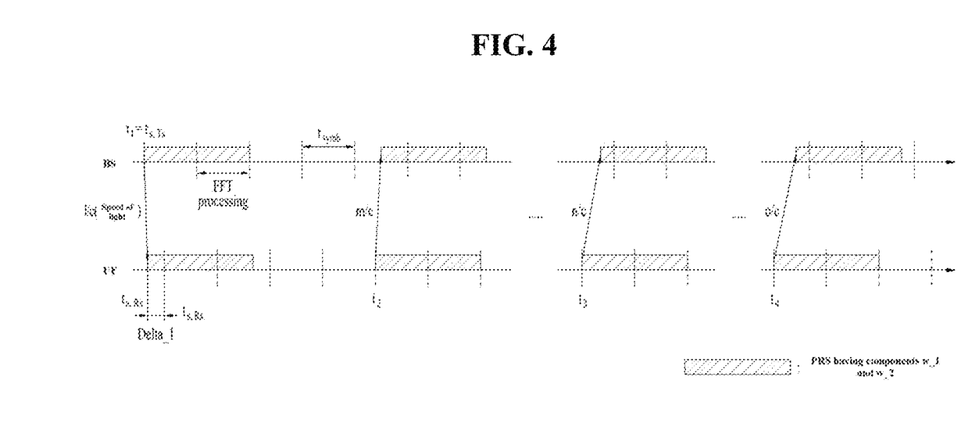
FIG. 4 illustrates an example of DL/UL PRS transmission times for a BS and the UE.

[Proposal #1] DL/UL PRS Transmission Method for Measuring Distance Between Moving UE and BS FIG. 3 illustrates an example of a movement path of a UE, and FIG. 4 illustrates an example of DL/UL PRS transmission times of a BS and the UE.

As an example, suppose that a UE moves along a designated path over time as shown in FIG. 3, and a BS and the UE transmit a DL/UL PRS at specific times to estimate a distance therebetween as shown in FIG. 4. In the example, l, m, n, and o denote the distances between the BS and the UE at times $t_1$, $t_2$, $t_3$, and $t_4$.

Initially, the BS transmits a DL PRS including sinusoidal waves having angular frequencies w1 and w2 at time $t_1=t_{s,Tx}$. Subsequently, after a delay of 1/c based on the distance l between the BS and the UE and the speed c of light, the signal reaches the UE at $t_{a,Rx}$. Due to actual sampling (quantization), sampling values of the baseband signal are obtained from the time $t_{s,Rx}$. When it is assumed that the FFT size is N, the UE may obtain values corresponding to w1 and w2 by inputting a total of N sampling values into the FFT. Here, the phase difference between the two values may be represented by Equation 4 below.

$$B = \arg\left(\frac{X_{RX}(w_2)}{X_{RX}(w_1)}\right) = \quad \text{[Equation 4]}$$
$$(w_2-w_1)(t_{s,RX}-t_{a,RX}) = (w_2-w_1)(t_{s,RX}-t_{s,TX}-l/c)$$

Since $w_2-w_1$ is a value known to the UE, the UE may obtain $t_{s,RX}-t_{a,RX}=t_{s,RX}-t_{s,TX}-1/c=$delta_1 from Equation 4. delta_1 represents a difference between the time at which the UE starts OFDM processing and the time at which the signal actually reaches the UE.

Like the BS, the UE transmits a first UL PRS in the same manner at $t_2$ after n symbols, such that the phase difference between the sinusoidal component of the angular frequency w1 and the sinusoidal component of the angular frequency w2 becomes a value B obtained from Equation 4. Thereafter, the BS performs FFT with N sampling values from $t_{s,Tx}+(n+1)*t\_symb$. The BS may obtain the value of $t_{s,Tx}+t\_symb-t_{s,RX}-m/c+$delta_1 based on the phase difference between the two angular frequencies w1 and w2. FIG. 4 shows the case where n=4.

Accordingly, the BS may obtain t_symb−($t_{s,TX}$+t_symb−$t_{s,RX}$−m/c+delta_1)=(1+m)/c. If there is little movement of the UE between the time when the BS transmits the DL PRS and the time when the UE transmits the first UL PRS, l may be almost equal to m. Therefore, the BS may estimate the distance l between the BS and the UE.

Similarly, the UE transmits a second UL PRS at time such that the phase difference between the sinusoidal component of the angular frequency w1 and the sinusoidal component of the angular frequency w2 becomes the value B of Equation 4. The BS may obtain N sampling values for the second UL PRS and perform FFT. Thus, the BS may obtain a value of $t_{s,TX}$+t_symb−$t_{s,RX}$−n/c+delta_1=(1+n)/c based on the phase difference between the two angular frequencies w1 and w2. Since the BS has estimated the value of l through the first UL PRS sent by the UE at time $t_2$, the BS may estimate a distance n between the BS and the UE only with the second UL PRS transmitted by the UE at time $t_3$. In this manner, the BS may recognize a distance o between the BS and the UE through a third UL PRS sent by the UE at time $t_4$.

According to this method, the BS does not need to transmit the DL PRS every time the distance is estimated, and therefore the DL PRS overhead of the BS may be reduced.

[Proposal #2] PRS Configuration Method

In order to estimate the distance between the BS and the UE with a desired accuracy, the DL/UL PRS configuration may vary according to a moving speed of the UE or a channel environment between the BS and the UE. For example, when the UE moves quickly, the distance between the BS and the UE may change quickly, and accordingly the UE needs to frequently transmit the UL PRS. Therefore, a DL/UL PRS configuration method is needed to increase the accuracy of distance estimation using Proposal #1.

When the UE accesses a new BS, the UE may feedback the location (e.g., GNSS-based location) and speed of the UE to the BS. The BS may determine a DL/UL PRS periodicity for distance estimation with a required accuracy, based on the location information and the speed information received from the UE.

The BS may also calculate the number of subframes in which the BS and the UE should transmit a DL/UL PRS within a positioning occasion, based on the strength (e.g., RSRP) of the signal received from the UE.

Figure 5:
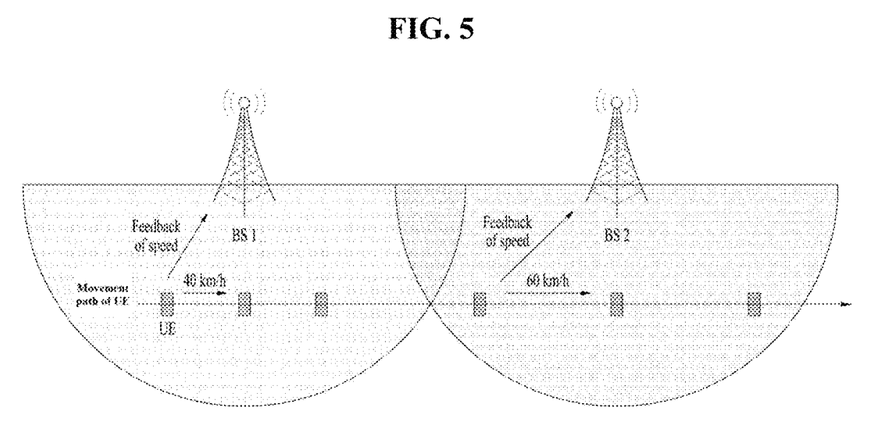
FIG. 5 illustrates an example of change of serving BSs according to movement of a UE.
Figure 6:
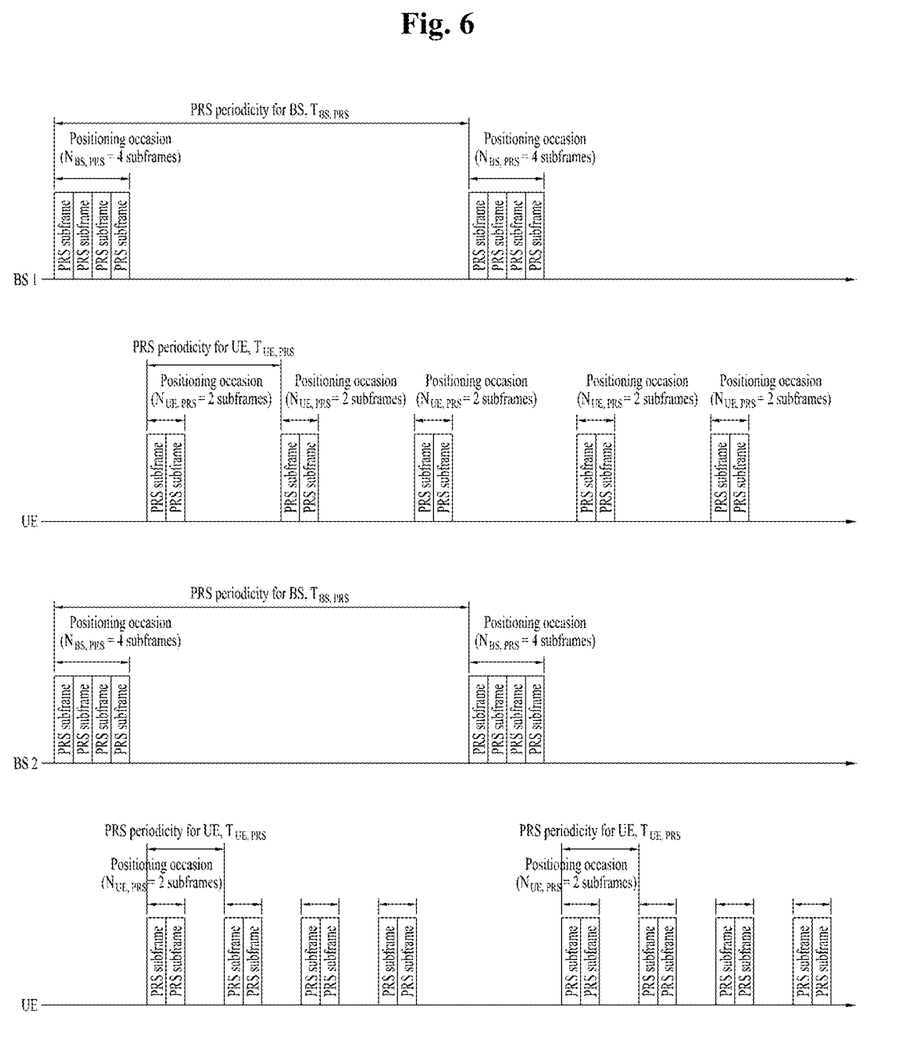
FIG. 6 illustrates an example of DL/UL PRS transmission and reception of a BS and a UE.

FIG. 5 illustrates an example of change of serving BSs according to movement of a UE. FIG. 6 illustrates an example of DL/UL PRS transmission and reception of a BS and a UE.

Referring to FIGS. 5 and 6, the UE moves faster within the coverage of BS 2 than when moving within the coverage of BS 1. Therefore, in order to accurately estimate the BS-to-UE distance, the UE should more frequently transmit the UL PRS when the UE is within the coverage of BS 2.

A BS may configure the periodicity ($T_{UE, PRS}$), the number of PRS subframes ($N_{UE, PRS}$), and the PRS resource position/code of DL/UL PRSs transmitted during a first positioning occasion, for the UE that enters the coverage of the BS (e.g., through DCI).

Hereinafter, a method of changing the UL PRS configuration based on UE triggering will be described.

Step 1: The UE makes a request to the BS for change of UL PRS configuration. When change in speed of the UE is greater than or equal to a specific value with respect to the speed of which the UE has informed the BS when the UE initially accesses the BS, the UE may send a signal for requesting change of the UL PRS configuration, through a control channel or a newly defined separate signal in a PRS subframe. In this case, the UE may also send the current speed information thereof to allow the BS to determine the UL PRS configuration again.

Step 2: The BS may check the UE ID and the speed information included in the UL PRS configuration change request from the UE and determine the UL PRS configuration again.

Step 3: The BS informs the UE of the changed UL PRS configuration. The UE may receive the changed UL PRS configuration through the DCI of the PRS subframe, and transmit UL PRSs according to the changed UL PRS configuration.

Hereinafter, configuration of phase information transmitted to the BS through the UL PRS of the UE will be described.

Figure 7:
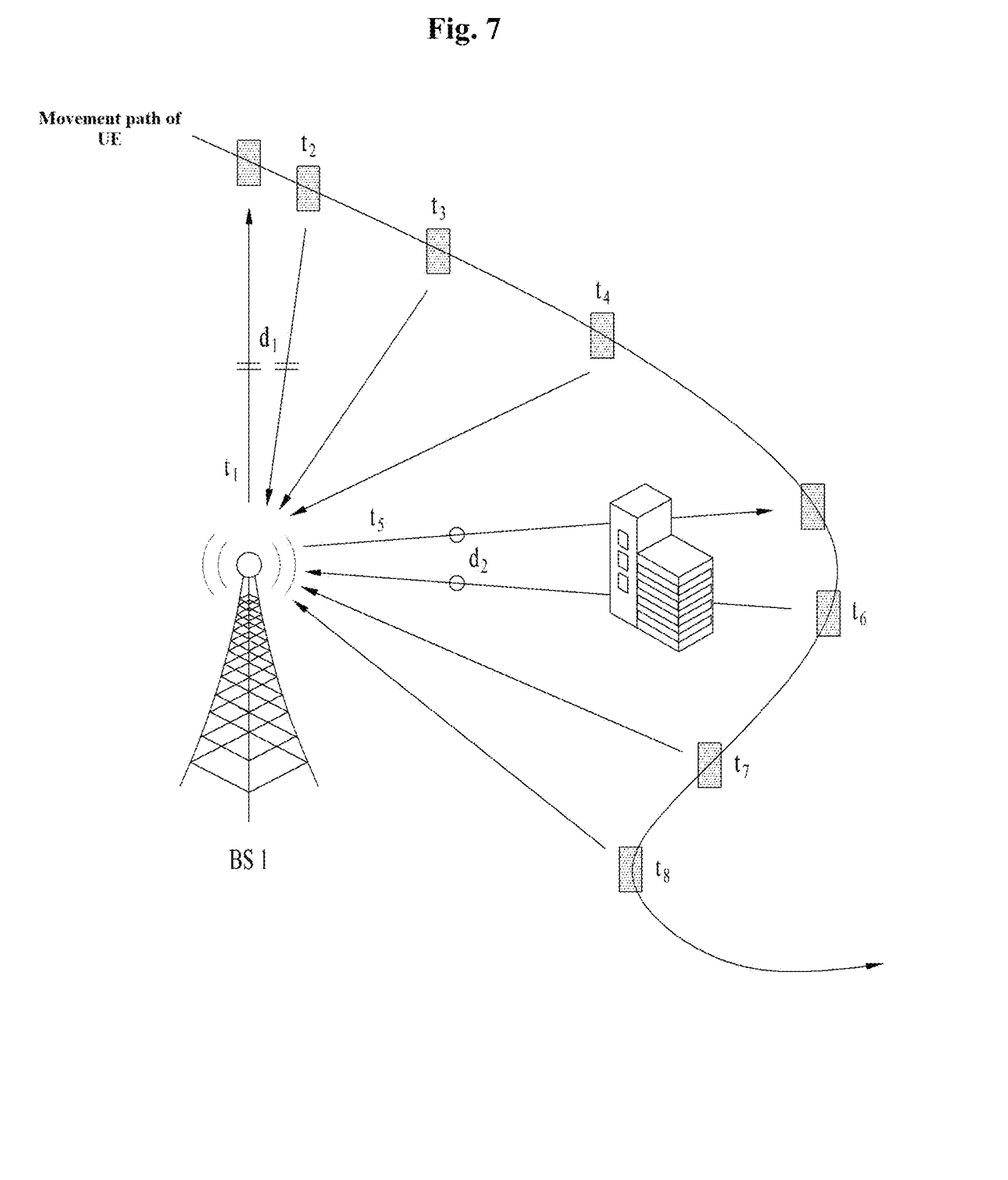
FIG. 7 illustrates an example of DL/UL PRS transmission of a BS and a UE according to a movement path of the UE.

FIG. 7 illustrates an example of DL/UL PRS transmission of a BS and a UE according to a movement path of the UE.

Suppose that there is little movement of the UE from time $t_1$ to time $t_2$, and thus the distance between the UE and the BS is almost the same at time $t_1$ to time $t_2$. The BS transmits a first DL PRS to the UE at time $t_1$ and the UE acquires a phase difference $B_1$ through the first DL PRS received from the BS. The UE may transmit the phase difference $B_1$ acquired through the DL PRS to the BS through a first UL PRS at time $t_2$, and the BS may receive the first UL PRS and estimate a distance $d_1$ between the BS and the UE.

At time $t_3$, the UE transmits information about the phase difference $B_1$ to the BS through a second UL PRS. The BS may measure the distance between the BS and the UE at the time $t_3$ based on the second UL PRS received from the UE and the estimated value of $d_1$.

Similarly, the UE acquires a phase difference $B_2$ through a second DL PRS transmitted by the BS at time $t_5$. At time $t_6$, the UE may transmit information about the phase difference $B_2$ to the BS through a third UL PRS, and the BS may measure a distance $d_2$ between the BS and the UE. When the UE transmits the information about the phase difference $B_2$ to the BS through a fourth UL PRS at time $t_7$, the BS may measure the distance between the BS and the UE at the time t based on the fourth UL PRS received from the UE and the estimated value of $d_2$.

However, the measured value of $d_2$ may be inaccurate due to an obstacle present between the BS and the UE at times $t_5$ and $t_6$. In this case, the distance between the BS and the UE acquired based on $d_2$ at time $t_7$ may a large error. In order to address this issue, when the UE transmits the fourth UL PRS at time $t_7$, the phase difference $B_1$ obtained earlier in place of the phase difference $B_2$ may be configured in the fourth UL PRS in transmitting the fourth UL PRS. In other words, the UE may transmits the fourth UL PRS having the phase difference $B_1$ to the BS at time $t_7$, and the BS may measure the distance between the BS and the UE at the time t based on the previously estimated value of $d_1$. The distance between the UE and the BS measured as described above may be more accurate than the distance obtained based on the phase difference $B_2$.

Accordingly, the phase information contained in the UL PRS sent from the UE to the BS may not be the phase information that is obtained through the DL PRS received from the BS most recently, but may be what is retained in the UE through a DL PRS received from the BS in the past.

When the UE receives DL PRS a plurality of times, it is necessary to determine a DL PRS through which the phase information to be transmitted over a UL PRS is acquired. The UE may determine the DL PRS for acquiring the phase information based on the signal strength of the DL PRS or the speed of the UE at the time of receiving the DL PRS.

The UE may provide the BS with information about the time at which the phase information carried in the UL PRS is acquired, through a control channel of the PRS subframe or a newly defined separate signal.

Figure 8:
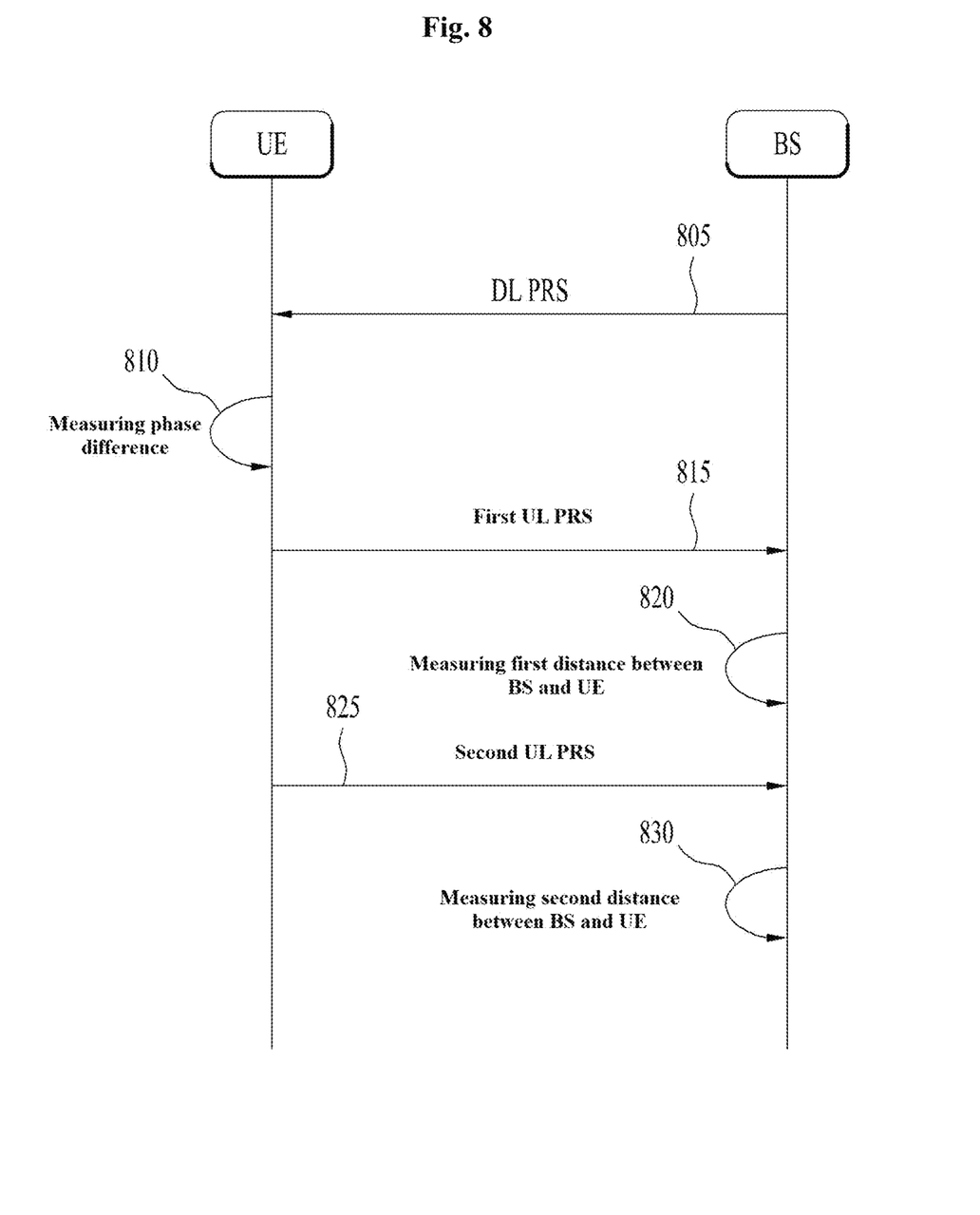
FIG. 8 is a flowchart illustrating a reference signal transmission/reception method for distance measurement according to an embodiment of the present disclosure.

FIG. 8 is a flowchart illustrating a reference signal transmission/reception method for distance measurement according to an embodiment of the present disclosure.

Referring to FIG. 8, in operation 805, the UE receives a DL PRS including sinusoidal components of different angular frequencies from a BS.

In operation 810, the UE acquires a phase difference between the sinusoidal components of the DL PRS.

In operation 815, the UE transmits a first uplink (UL) PRS indicating the phase difference for measurement of a first distance between the UE and the BS at a first time.

In operation 820, the BS measures a first distance between the UE and the BS at a first time, based on the first UL PRS.

In operation 825, the UE transmits a second UL PRS for measurement of a second distance between the UE present at a changed location after the first time and the BS. The UE may configure, in the second UL PRS, the same phase difference acquired through the DL PRS before the first time, without receiving an additional DL PRS for measurement of the second distance.

In operation 830, the BS measures the second distance between the UE whose location is changed after the first time and the BS, based on the second UL PRS.

The UE may transmit the first UL PRS and the second UL PRS based on a UL PRS configuration acquired from the BS. When change in speed of the UE greater than or equal to a threshold, the UE may make a request to the BS for change of the UL PRS configuration.

The UE may report the speed of the UE upon initial access to the BS. When the difference between the reported speed and the current speed of the UE is greater than or equal to the threshold, the UE may make the request to the BS for change of the UL PRS configuration.

The UL PRS configuration may include UL PRS periodicity information, UL PRS subframe information, and UL PRS resource information.

The phase difference may be related to $(w_2-w_1)*(t_{s,Rx}-t_{a,Rx})$. Here, 'w1' and 'w2' denote the angular frequencies of sinusoidal components of the DL PRS, respectively, '$t_{s,Rx}$' may denote a start time for signal processing of the DL PRS by the UE, and '$t_{a,Rx}$' may denote an arrival time of the DL PRS at the UE.

Figure 9:
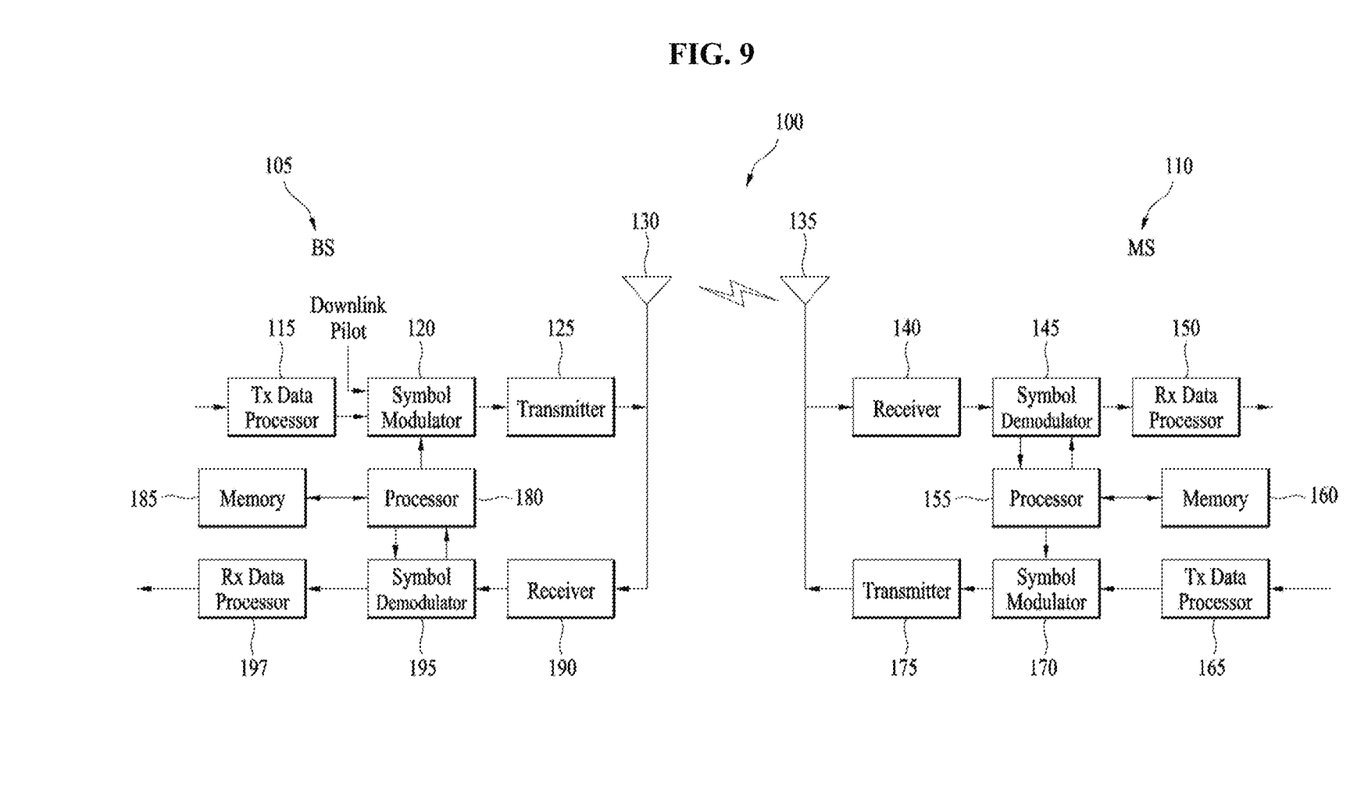
FIG. 9 is a block diagram illustrating a transmission apparatus and a reception apparatus according to an embodiment of the present disclosure.

FIG. 9 is a block diagram illustrating the configurations of a transmission device 105 and a reception device 110 in a wireless communication system 100 according to an embodiment of the present disclosure. For convenience, while it is assumed that the transmission device is a base station (BS) and the reception device is a terminal, the present disclosure is not limited thereto, and each of the transmission device and the reception device may be interpreted as any wireless node.

The BS may also be referred to as an eNB or gNB. The terminal may be referred to as a UE.

Although one transmission device 105 and one reception device 110 are shown to simplify the wireless communication system 100, the wireless communication system 100 may include one or more transmission devices and/or one or more reception devices.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a multiple input multiple output (MIMO) system. The BS 105 according to the present disclosure may support both a single user-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a time division multiplexing (TDM) symbol, or a code division multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it may provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS may be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it may store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it may be driven by the processor 155 or 180.

Radio interface protocol layers among the UE 110, the BS 105, and a wireless communication system (i.e., network) may be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A radio resource control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features may be implemented in a form failing to be combined with other elements or features. Moreover, it is able to implement an embodiment of the present disclosure by combining elements and/or features together in part. A sequence of operations explained for each embodiment of the present disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

While the present disclosure has been described and illustrated herein with reference to the preferred embodiments thereof, it will be apparent to those skilled in the art that various modifications and variations may be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

As described above, the present disclosure may be applied to various wireless communication systems.

The invention claimed is:

1. A method for transmitting and receiving, by a terminal, a reference signal for distance measurement in a wireless communication system, the method comprising:
   receiving a downlink (DL) positioning reference signal (PRS) including sinusoidal components of different angular frequencies from a base station;
   acquiring a phase difference between the sinusoidal components of the DL PRS;
   transmitting a first uplink (UL) PRS indicating the phase difference for measurement of a first distance between the terminal and the base station at a first time; and
   transmitting a second UL PRS for measurement of a second distance between the base station and the terminal which is present at a different location after the first time,
   wherein the terminal configures, in the second UL PRS, the same phase difference acquired through the DL PRS before the first time, without receiving an additional DL PRS for measurement of the second distance,
   wherein the phase difference is related to $(w_2-w_1)*(t_{s,Rx}-t_{a,Rx})$, and
   wherein 'w1' and 'w2' denote the angular frequencies of the sinusoidal components of the DL PRS, respectively, '$t_{s,Rx}$' denotes a start time for signal processing of the DL PRS by the terminal, and '$t_{a,Rx}$' denotes an arrival time of the DL PRS at the terminal.

2. The method of claim 1,
   wherein the terminal transmits the first UL PRS and the second UL PRS based on a UL PRS configuration acquired from the base station, and
   wherein, based on change in speed of the terminal greater than or equal to a threshold, the terminal makes a request to the base station for change of the UL PRS configuration.

3. The method of claim 2,
   wherein the terminal reports a speed of the terminal upon initial access to the base station, and
   wherein, based on a difference between the reported speed and a current speed of the terminal being greater than or equal to a threshold, the terminal requests that the base station change the UL PRS configuration.

4. The method of claim 2, wherein the UL PRS configuration comprises UL PRS periodicity information, UL PRS subframe information, and UL PRS resource information.

5. A method for transmitting and receiving, by a base station, a reference signal for distance measurement in a wireless communication system, the method comprising:
   transmitting a downlink (DL) positioning reference signal (PRS) including sinusoidal components of different angular frequencies to a terminal;
   receiving a first uplink (UL) PRS indicating a phase difference between the sinusoidal components of the DL PRS;
   measuring a first distance between the terminal and the base station at a first time based on the first UL PRS;
   receiving a second UL PRS without transmitting an additional DL PRS to the terminal which is present at a different location after the first time; and
   measuring a second distance between the base station and the terminal at the different location after the first time based on the second UL PRS, wherein the phase difference is related to $(w_2-w_1)*(t_{s,Rx}-t_{a,Rx})$, and wherein 'w1' and 'w2' denote the angular frequencies of the sinusoidal components of the DL PRS, respectively, '$t_{s,Rx}$' denotes a start time for signal processing of the DL PRS by the terminal, and '$t_{a,Rx}$' denotes an arrival time of the DL PRS at the terminal.

6. A terminal configured for transmitting and receiving a reference signal for distance measurement in a wireless communication system, the terminal comprising:

a transceiver; and a processor configured to:

receive a downlink (DL) positioning reference signal (PRS) including sinusoidal components of different angular frequencies from a base station through the transceiver;

acquire a phase difference between the sinusoidal components of the DL PRS;

transmit a first uplink (UL) PRS indicating the phase difference for measurement of a first distance between the terminal and the base station at a first time; and transmit a second UL PRS for measurement of a second distance between the base station and the terminal which is present at a different location after the first time, wherein the processor configures, in the second UL PRS, the same phase difference acquired through the DL PRS before the first time, without receiving an additional DL PRS for measurement of the second distance, wherein the phase difference is related to $(w_2-w_1)*(t_{s,Rx}-t_{a,Rx})$, and wherein 'w1' and 'w2' denote the angular frequencies of the sinusoidal components of the DL PRS, respectively, '$t_{s,Rx}$' denotes a start time for signal processing of the DL PRS by the terminal, and '$t_{a,Rx}$' denotes an arrival time of the DL PRS at the terminal.

7. The terminal of claim 6, wherein the processor transmits the first UL PRS and the second UL PRS based on a UL PRS configuration acquired from the base station, and wherein, based on change in speed of the terminal greater than or equal to a threshold, the processor makes a request to the base station for change of the UL PRS configuration.

8. The terminal of claim 7, wherein the processor reports a speed of the terminal upon initial access to the base station, and wherein, based on a difference between the reported speed and a current speed of the terminal being greater than or equal to a threshold, the terminal requests that the base station change the UL PRS configuration.

9. The terminal of claim 7, wherein the UL PRS configuration comprises UL PRS periodicity information, UL PRS subframe information, and UL PRS resource information.

10. The terminal of claim 6, wherein the terminal is capable of communicating with at least one of another terminal, a terminal related to an autonomous driving vehicle, the base station or a network.

* * * * *